US012630317B1

(12) United States Patent (10) Patent No.: US 12,630,317 B1

Ripplinger et al. (45) Date of Patent: May 19, 2026

(54) ELEVATED AUTONOMOUS RESCUE SIGNAL ANTENNA

(71) Applicant: Battle Sight Technologies, LLC, Dayton, OH (US)

(72) Inventors: Nicholas R. Ripplinger, Springboro, OH (US); Christopher J. Vogt, Cincinnati, OH (US); Daniel A. Reed, Centerville, OH (US); Sunny L. Kapka, Springboro, OH (US)

(73) Assignee: Battle Sight Technologies, LLC, Dayton, OH (US)

( * ) Notice: Subject to any disclaimer, the term of this patent is extended or adjusted under 35 U.S.C. 154(b) by 0 days.

(21) Appl. No.: 18/829,538

(22) Filed: Sep. 10, 2024

Related U.S. Application Data

(60) Provisional application No. 63/585,012, filed on Sep. 25, 2023, provisional application No. 63/581,816, filed on Sep. 11, 2023.

(51) Int. Cl.
| | |
|---|---|
| B64U 70/40 | (2023.01) |
| B64U 10/10 | (2023.01) |
| B64U 20/80 | (2023.01) |
| B64U 30/297 | (2023.01) |

(52) U.S. Cl.
CPC ............. B64U 70/40 (2023.01); B64U 10/10 (2023.01); B64U 20/80 (2023.01); B64U 30/297 (2023.01)

(58) Field of Classification Search
CPC ........ B64U 70/40; B64U 10/10; B64U 20/80; B64U 30/297
See application file for complete search history.

(56) References Cited

U.S. PATENT DOCUMENTS

| | | | | | |
|---|---|---|---|---|---|
| 2,406,625 | A | * | 8/1946 | Oglesby | ................ B64C 39/068 244/45 R |
| 2,481,745 | A | * | 9/1949 | Hiller, Jr. | ................ B64C 27/10 416/115 |
| 2,486,059 | A | * | 10/1949 | Pentecost | ................ B64C 27/10 244/17.11 |
| 2,497,040 | A | * | 2/1950 | Williams | ................ B64C 27/10 416/143 |
| 2,586,059 | A | * | 2/1952 | Koeppel | ................. B41J 29/15 248/442.2 |
| 2,669,308 | A | * | 2/1954 | Thomson | ................ B64C 27/54 416/115 |
| 2,712,420 | A | * | 7/1955 | Amster | .............. B64C 29/0091 244/225 |
| 2,743,886 | A | * | 5/1956 | Driggs | ................... B64C 29/02 D12/326 |
| 2,772,745 | A | * | 12/1956 | Bordoni | ................. B64C 27/12 416/46 |

(Continued)

OTHER PUBLICATIONS

Zufferey et al., How ornithopters can perch autonomously on a branch, Nature Communications, published online Dec. 13, 2022.

(Continued)

*Primary Examiner* — Medhat Badawi
(74) *Attorney, Agent, or Firm* — Thomas E. Lees, LLC

(57) ABSTRACT

This disclosure teaches a signaling beacon affixed to a drone. The drone comprises a controller, which is operatively coupled to the signaling beacon. The controller autonomously pilots the drone to an elevated perch. The controller further activates the signaling beacon.

17 Claims, 5 Drawing Sheets

(56) References Cited

U.S. PATENT DOCUMENTS

| | | | | |
|---|---|---|---|---|
| 3,118,504 A * | 1/1964 | Cresap | B64C 27/52 | |
| | | | 416/102 | |
| 3,149,803 A * | 9/1964 | Petrides | B64C 39/022 | |
| | | | 244/17.23 | |
| 3,570,787 A * | 3/1971 | Stahmer | B64C 27/12 | |
| | | | 244/17.23 | |
| 3,643,599 A * | 2/1972 | Hubich | F42B 10/14 | |
| | | | 102/388 | |
| 3,722,830 A * | 3/1973 | Barber | B64C 19/00 | |
| | | | 244/17.23 | |
| 4,080,922 A * | 3/1978 | Brubaker | B63B 1/322 | |
| | | | 114/282 | |
| 4,163,535 A * | 8/1979 | Austin | B64U 30/24 | |
| | | | 244/17.11 | |
| 4,478,379 A * | 10/1984 | Kerr | B64U 10/13 | |
| | | | 244/17.11 | |
| 5,058,824 A * | 10/1991 | Cycon | G05D 1/0033 | |
| | | | 244/190 | |
| 5,289,994 A * | 3/1994 | Del Campo Aguilera | | |
| | | | B64U 30/10 | |
| | | | 244/17.23 | |
| 5,497,960 A * | 3/1996 | Previnaire | G03B 15/006 | |
| | | | 348/144 | |
| 5,628,620 A * | 5/1997 | Arlton | A63H 27/12 | |
| | | | 446/40 | |
| 5,657,947 A * | 8/1997 | Mayersak | F42C 19/00 | |
| | | | 89/1.56 | |
| 5,996,933 A * | 12/1999 | Schier | B64C 39/06 | |
| | | | 244/17.11 | |
| 6,179,247 B1 * | 1/2001 | Milde, Jr. | B64C 29/00 | |
| | | | 244/23 C | |
| 6,343,768 B1 * | 2/2002 | Muldoon | B64C 29/0033 | |
| | | | 244/7 R | |
| 6,347,764 B1 * | 2/2002 | Brandon | F42B 10/58 | |
| | | | 102/388 | |
| 6,398,157 B1 * | 6/2002 | Ingram | B64C 29/02 | |
| | | | 244/46 | |
| 6,402,031 B1 * | 6/2002 | Hall | G05B 19/00 | |
| | | | 235/400 | |
| 6,450,445 B1 * | 9/2002 | Moller | B64U 50/14 | |
| | | | 244/12.6 | |
| 6,588,701 B2 * | 7/2003 | Yavnai | G05D 1/0044 | |
| | | | 244/23 B | |
| 7,621,480 B2 * | 11/2009 | Darrow, Jr. | B64C 7/00 | |
| | | | 416/41 | |
| 8,167,234 B1 * | 5/2012 | Moore | B64U 10/80 | |
| | | | 244/17.23 | |
| 8,418,959 B2 * | 4/2013 | Kang | B64U 80/25 | |
| | | | 244/116 | |
| 8,505,846 B1 * | 8/2013 | Sanders, II | B64C 11/003 | |
| | | | 244/7 B | |
| 9,434,471 B2 * | 9/2016 | Arlton | B64U 30/21 | |
| 9,517,838 B1 * | 12/2016 | Howard | B64C 27/12 | |
| 9,975,633 B1 * | 5/2018 | Johnson | B64C 11/001 | |
| 9,981,744 B2 * | 5/2018 | Choo | B64C 29/0025 | |
| 10,054,958 B2 * | 8/2018 | Creasman | B64U 30/12 | |
| 10,093,417 B2 * | 10/2018 | Meringer | B64U 70/10 | |
| 10,112,707 B1 * | 10/2018 | Howard | B64U 10/17 | |
| 10,287,010 B2 * | 5/2019 | Stamps | B64U 30/293 | |
| 10,370,089 B2 * | 8/2019 | Gamble | B64C 27/52 | |
| 10,502,188 B2 * | 12/2019 | Gamble | F03D 17/00 | |
| 10,597,153 B1 * | 3/2020 | Schuller | B64C 3/16 | |
| 10,814,968 B2 * | 10/2020 | Gamble | B64C 27/39 | |
| 10,906,665 B1 * | 2/2021 | Hessling-Von Heimendahl | | |
| | | | H05B 45/20 | |
| 10,946,956 B2 * | 3/2021 | Campbell | B64C 29/0033 | |
| 11,067,374 B2 * | 7/2021 | Hill | F42C 1/00 | |
| 11,148,806 B2 * | 10/2021 | Suzuki | B64U 50/19 | |
| 11,242,147 B2 * | 2/2022 | Zvara | B64D 1/22 | |
| 11,319,062 B1 * | 5/2022 | Truong | B64C 11/001 | |
| 11,577,827 B2 * | 2/2023 | Randall | B64U 70/80 | |
| 11,649,051 B2 * | 5/2023 | Arlton | B64U 30/21 | |
| | | | 244/17.23 | |
| 11,794,879 B2 * | 10/2023 | Poltorak | B64C 39/024 | |
| 11,940,251 B2 * | 3/2024 | Hill | F42B 25/00 | |
| 11,995,996 B1 * | 5/2024 | Puglisi | B64U 10/14 | |
| 12,110,138 B2 * | 10/2024 | Deng | B64U 50/19 | |
| 12,202,591 B2 * | 1/2025 | Baxter | B64U 10/25 | |
| 12,240,633 B2 * | 3/2025 | Arlton | B64U 10/13 | |
| 12,319,410 B2 * | 6/2025 | Gray | B64D 1/12 | |
| 2003/0006339 A1 * | 1/2003 | Capanna | B64C 29/02 | |
| | | | 244/7 R | |
| 2004/0129833 A1 * | 7/2004 | Perlo | B64U 30/10 | |
| | | | 244/70 | |
| 2005/0051667 A1 * | 3/2005 | Arlton | G08B 13/19621 | |
| | | | 244/17.11 | |
| 2006/0011777 A1 * | 1/2006 | Arlton | B64U 10/17 | |
| | | | 244/7 B | |
| 2008/0210809 A1 * | 9/2008 | Arlton | B64U 20/80 | |
| | | | 244/17.11 | |
| 2008/0245924 A1 * | 10/2008 | Arlton | B64U 30/24 | |
| | | | 244/17.23 | |
| 2009/0014599 A1 * | 1/2009 | Cylinder | B64U 10/10 | |
| | | | 244/7 R | |
| 2009/0212157 A1 * | 8/2009 | Arlton | G08B 13/1963 | |
| | | | 701/2 | |
| 2010/0130093 A1 * | 5/2010 | Van de Rostyne | B64C 27/625 | |
| | | | 446/37 | |
| 2010/0140415 A1 * | 6/2010 | Goossen | B64U 10/20 | |
| | | | 29/889.7 | |
| 2011/0290937 A1 * | 12/2011 | Salkeld | G05D 1/0094 | |
| | | | 348/E7.085 | |
| 2013/0105635 A1 * | 5/2013 | Alzu'bi | B64U 10/14 | |
| | | | 244/23 A | |
| 2013/0149151 A1 * | 6/2013 | Rauber | B64C 27/43 | |
| | | | 416/131 | |
| 2014/0091172 A1 * | 4/2014 | Arlton | B64U 50/19 | |
| | | | 244/17.23 | |
| 2014/0299708 A1 * | 10/2014 | Green | B64C 27/605 | |
| | | | 244/17.11 | |
| 2015/0028155 A1 * | 1/2015 | Reiter | B64U 30/12 | |
| | | | 244/39 | |
| 2015/0247714 A1 * | 9/2015 | Teetzel | F42B 15/36 | |
| | | | 244/3.21 | |
| 2016/0122013 A1 * | 5/2016 | Thompson | B64C 27/50 | |
| | | | 416/1 | |
| 2016/0144954 A1 * | 5/2016 | Daigle | B64U 60/50 | |
| | | | 244/17.23 | |
| 2016/0167778 A1 * | 6/2016 | Meringer | B64U 10/13 | |
| | | | 244/17.11 | |
| 2016/0280359 A1 * | 9/2016 | Semke | B64U 60/60 | |
| 2016/0355257 A1 * | 12/2016 | Chappell | B64U 50/19 | |
| 2017/0015414 A1 * | 1/2017 | Chan | B64U 10/14 | |
| 2017/0233070 A1 * | 8/2017 | Starace | G05D 1/0858 | |
| | | | 244/7 B | |
| 2017/0274982 A1 * | 9/2017 | Beckman | B64C 3/54 | |
| 2017/0274988 A1 * | 9/2017 | Nguyen | B64U 60/50 | |
| 2017/0284371 A1 * | 10/2017 | Gamble | F03D 17/00 | |
| 2018/0046177 A1 * | 2/2018 | Hu | B64D 43/02 | |
| 2018/0057161 A1 * | 3/2018 | Groninga | B64C 27/24 | |
| 2018/0057162 A1 * | 3/2018 | Robertson | B64C 27/50 | |
| 2018/0118334 A1 * | 5/2018 | Stamps | B64C 27/12 | |
| 2018/0134387 A1 * | 5/2018 | Kovac | B29C 64/393 | |
| 2018/0354612 A1 * | 12/2018 | Hefner | B64C 27/605 | |
| 2019/0031316 A1 * | 1/2019 | Hefner | B64C 11/48 | |
| 2019/0047696 A1 * | 2/2019 | Gwin | B25J 9/1095 | |
| 2019/0176983 A1 * | 6/2019 | Darnell | B64C 25/52 | |
| 2019/0322368 A1 * | 10/2019 | Melcher | B64F 1/362 | |
| 2019/0337607 A1 * | 11/2019 | Lee | B64C 11/48 | |
| 2020/0218287 A1 * | 7/2020 | Wang | B64U 50/34 | |
| 2020/0218288 A1 * | 7/2020 | Johnson | B64U 30/26 | |
| 2020/0272173 A1 * | 8/2020 | Neubert | B64U 30/21 | |
| 2021/0110724 A1 * | 4/2021 | Wake | B64D 1/18 | |
| 2021/0229805 A1 * | 7/2021 | Getman | B64C 27/50 | |
| 2022/0063038 A1 * | 3/2022 | Monsarrat | B64C 25/68 | |
| 2022/0324569 A1 * | 10/2022 | Zhou | B64D 5/00 | |

(56) References Cited

U.S. PATENT DOCUMENTS

| | | | |
|---|---|---|---|
| 2023/0234706 A1* | 7/2023 | Arlton | B64U 20/80 |
| | | | 244/17.23 |
| 2023/0294828 A1* | 9/2023 | Arlton | B64C 39/024 |
| | | | 244/17.23 |
| 2023/0339594 A1* | 10/2023 | Baxter | B64C 9/08 |

OTHER PUBLICATIONS

Tian et al., Search and rescue under the forest canopy using multiple UAVs, The International Journal of Robotics Research, 2020, vol. 39.

* cited by examiner

ELEVATED AUTONOMOUS RESCUE SIGNAL ANTENNA

CROSS-REFERENCE TO RELATED APPLICATIONS

This application claims the benefit of U.S. Provisional Application No. 63/581,816, filed 2023 Sep. 11, and having the title "Elevated Autonomous Rescue Signal Antenna," and U.S. Provisional Application No. 63/585,012, filed 2023 Sep. 25, and having the title "Elevating Rescue Signal," both of which are incorporated by reference as if expressly set forth in their entireties herein.

BACKGROUND

Field of the Disclosure

The present disclosure relates generally to search and rescue and, more particularly, to search and rescue signaling.

Description of Related Art

When an individual is facing harsh elements (e.g., weather, terrain, animals, enemy combatants, etc.), chances of survival diminish rapidly with time. Thus, during search and rescue operations, there is a need to quickly find individuals to improve their chances of survival.

SUMMARY

The present disclosure provides systems and methods for elevating a rescue signal. Briefly described, one embodiment comprises a signaling beacon affixed to a drone. The drone comprises a controller, which is operatively coupled to the signaling beacon. The controller autonomously pilots the drone to an elevated perch. The controller further activates the signaling beacon.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A is a drawing that shows a side view of one embodiment of a signaling drone 100a.

FIG. 1B is a drawing that shows a cutaway view of one embodiment of a signaling drone 100b.

FIG. 2A is a drawing that shows a side view of a launch housing 200a.

DETAILED DESCRIPTION OF THE EMBODIMENTS

Figures 1A, 1B:
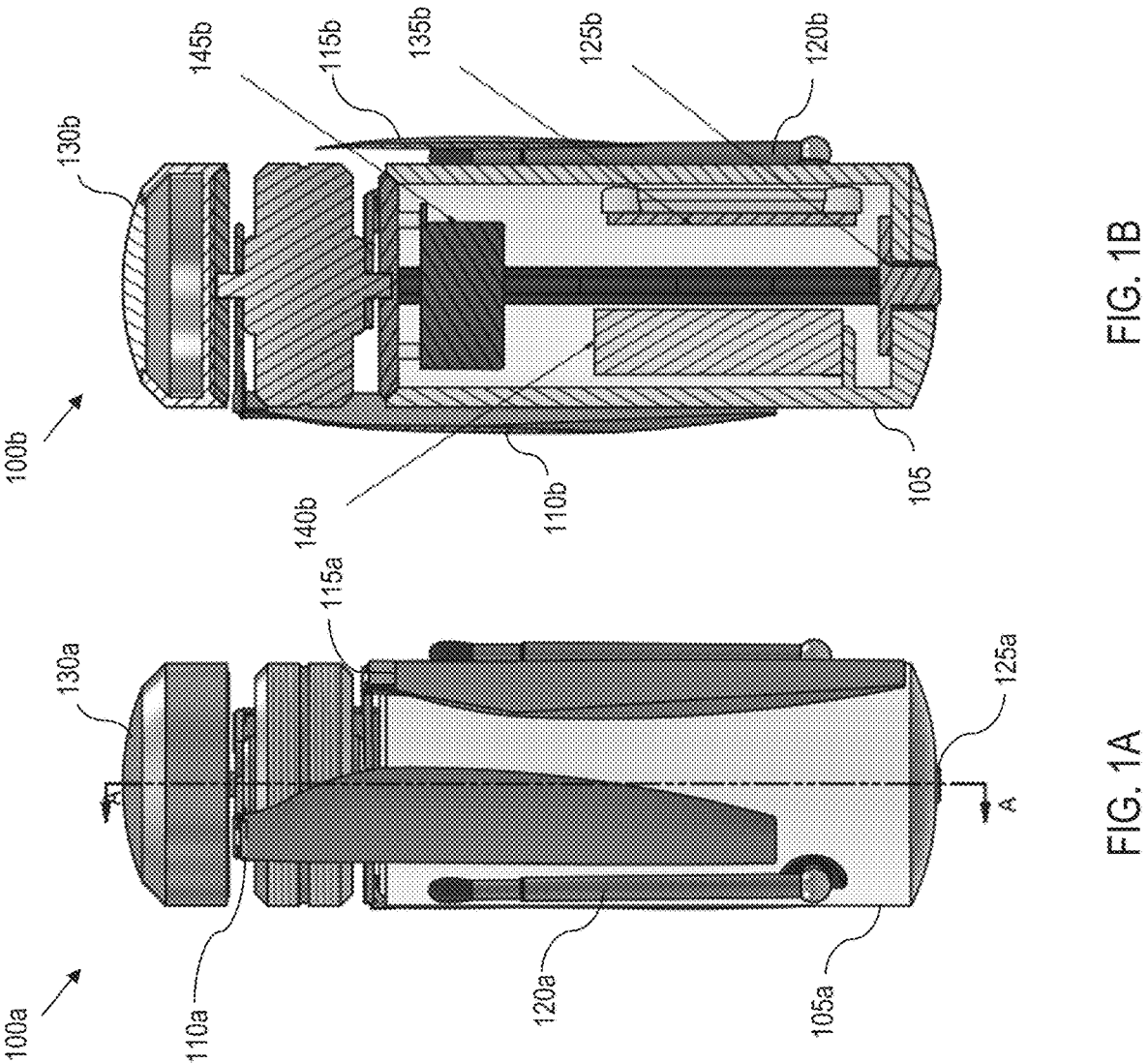
Figure 1D:
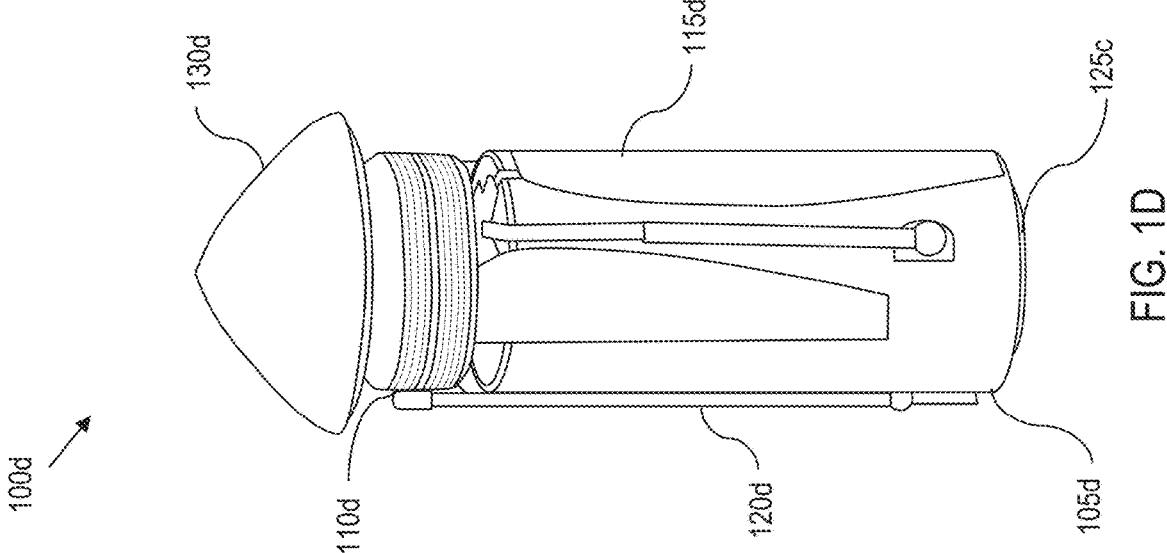
FIG. 1D is a drawing that shows a perspective view of one embodiment of a signaling drone 100d.
Figure 1C:
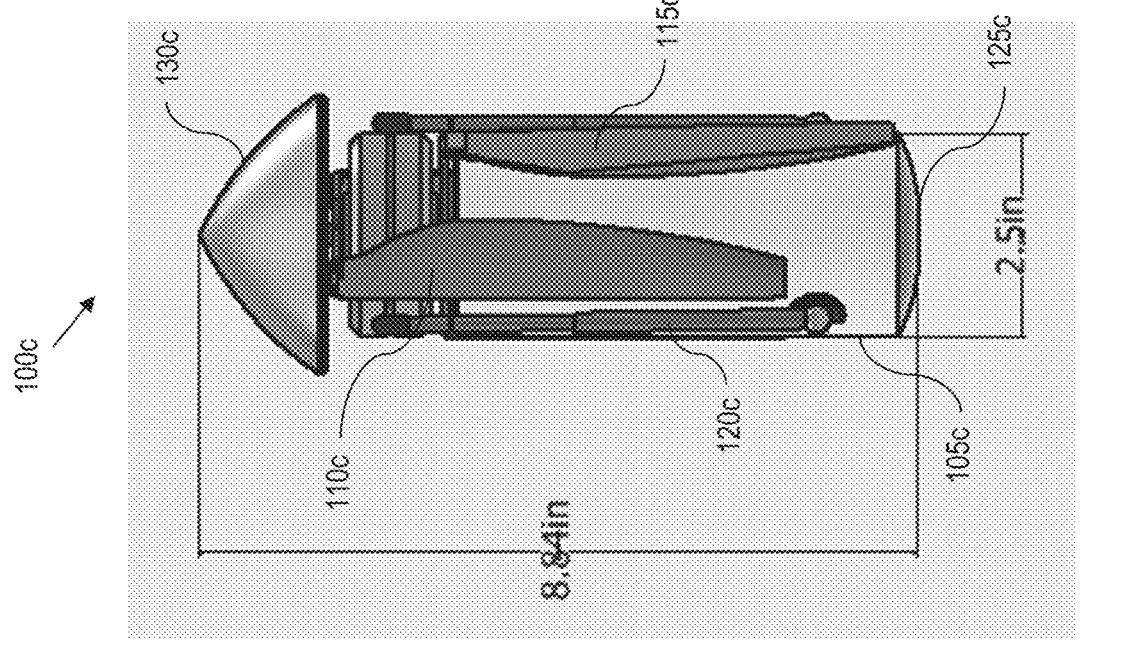
FIG. 1C is a drawing that shows a side view of another embodiment of a signaling drone 100c.
Figure 1E:
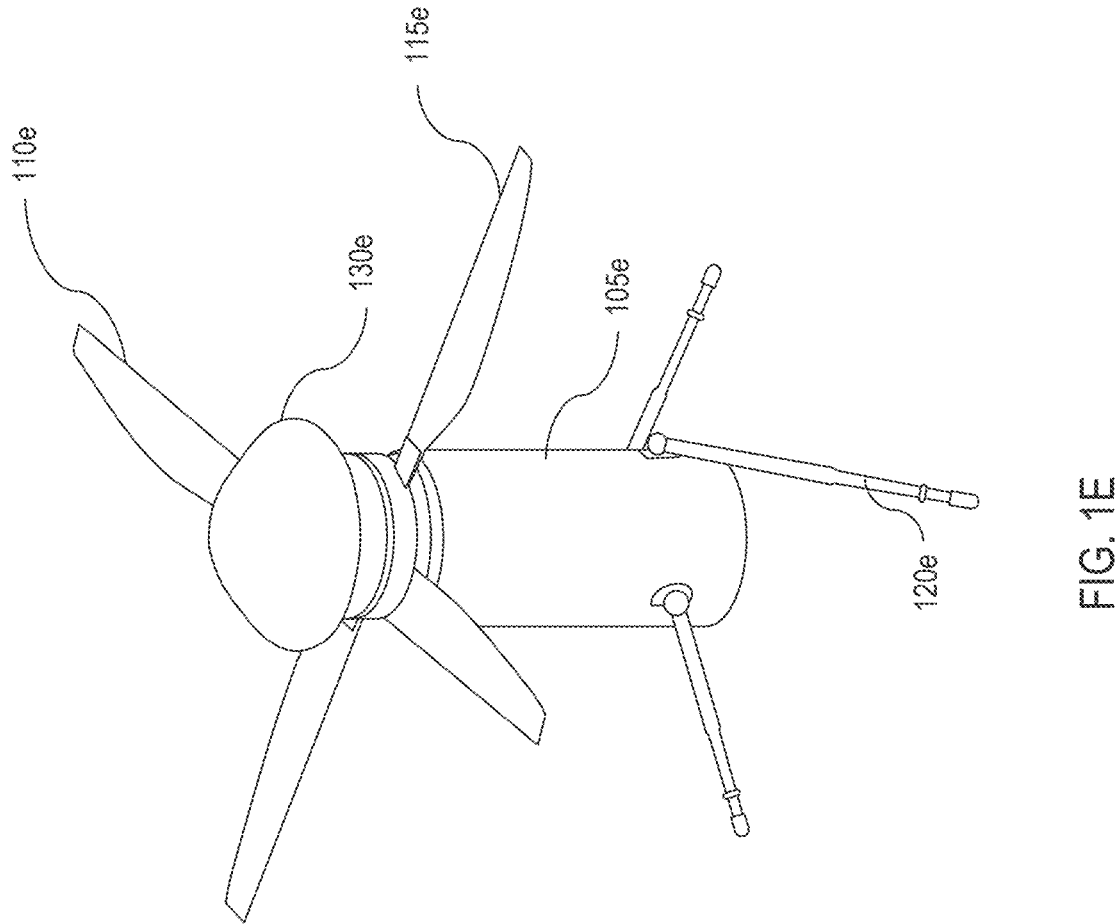
FIG. 1E is a drawing that shows a perspective view of one embodiment of a signaling drone 100e.
Figure 1E:

In recent years, there have been advances in drone technology, including advances in autonomous drones that are capable of autonomously finding and perching on an elevated perch that resides above ground level. For example, in 2022, the GRVC Robotics Lab from Seville, Spain, published in Nature Communications "How Ornithopters Can Perch Autonomously on a Branch" (Nature Communications (2022) 13:7713, by Raphael Zufferey et al.).

Despite these advances in autonomous drones, the use of such drones for search and rescue operations has yet to be fully explored. As is known, when an individual is facing harsh elements (e.g., weather, terrain, animals, enemy combatants, etc.), chances of survival diminish rapidly with time. Thus, during search and rescue operations, there is a need to quickly find individuals to improve their chances of survival. The ability to find individuals diminishes when those individuals are lost under a canopy of fauna, such as in dense jungles or wooded areas.

To facilitate search and rescue operations under dense canopy, this disclosure teaches a signaling system that comprises a signaling beacon affixed to a drone. The signaling system further comprises a controller that is operatively coupled to the signaling beacon. The controller autonomously pilots the drone to an elevated perch and, also, activates the signaling beacon. If the drone can be perched above the canopy at, for example, an elevated perch, then the visibility of the drone can be increased significantly, thereby increasing the chances of a speedy rescue and, correspondingly, increasing the chances of survival.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIGS. 1A, 1B, 1C, 1D, and 1E (collectively designated herein as FIG. 1) are drawings that show different views of several embodiments of signaling drones 100a, 100b, 100c, 100d, 100e (collectively designated herein as 100). As shown in FIG. 1, the drone 100 comprises a drone body 105a, 105b, 105c, 105d, 105e (collectively, 105). Rotatably affixed to the drone body 105 is a first rotor 110a, 110b, 110c, 110d, 110e (collectively, 110), which is configured to rotate about an axis at a first rotation speed with reference to the drone body 105. The first rotation speed is sufficient to elevate the drone 100 to, for example, an elevated perch or other elevated structure or surface above ground level.

A counter-rotating second rotor 115a, 115b, 115c, 115d, 115e (collectively, 115) is also rotatably affixed to the drone body 105. The second rotor 115 rotates about the same axis as the first rotor 110, but in an opposite direction from the first rotor 110 and at a second rotation speed. The first rotation speed and the second rotation speed can either be the same speed or different speeds. The second rotation speed of counter-rotating second rotor 115 counterbalances the first rotation speed of the rotating first rotor 110. For some embodiments, the counter-rotation of the second rotor 115 also elevates the drone 100.

As one having ordinary skill in the art will appreciate, for some embodiments the first rotor 110 and the second rotor 115 comprise a fixed-pitch propeller, while for other embodiments the first rotor 110 and the second rotor 115 comprise a controllable-pitch propeller. In some embodiments, the first rotor 110 and the second rotor 115 are foldable, thereby allowing for a smaller form factor, as shown in FIG. 1 (showing a small form factor with a drone 100 that is less than ten (10) inches (in) tall (specifically, 8.84 in tall) and less than three inches (3 in) wide (specifically, 2.5 in wide)). Those having skill in the art will appreciate that other embodiments, such as feathered propellers or other types of airfoils are contemplated for the first rotor 110 or the second rotor 115.

Continuing with FIG. 1, the drone 100 further comprises a perching structure 120a, 120b, 120c, 120d, 120e (collectively, 120) that is affixed external to the drone 100, preferably on the drone body 105. For some embodiments, the perching structure 120 comprises legs (such as the telescoping legs that are shown in FIG. 1). However, it should be appreciated that, for other embodiments, the perching structure 120 comprises hooks, or claws, or other known perching structures 120 that are capable of securing the drone 100 to a perch.

The drone 100 further comprises a detector 125a, 125b, 125c (collectively, 125), which is configured to detect whether the drone 100 has perched on an elevated perch. For some embodiments, the detector 125 comprises a camera that visibly detects whether the drone 100 has perched. In other embodiments, the detector 125 comprises one or more sensors that detect whether the drone 100 has perched.

The drone 100 further comprises a signaling beacon 130a, 130b, 130c, 130d, 130e (collectively, 130). In the embodiment of FIG. 1, the signaling beacon 130 is shown as residing atop the drone 100. However, those having skill in the art will appreciate that the signaling beacon 130 can be located at any place on the drone body 105 where the signaling beacon 130 is visible. For some embodiments, the signaling beacon 130 comprises a strobe light, either visible or infrared (IR) (or possibly a combination of both). Preferably, the signaling beacon 130 comprises a center wavelength that can be any value between approximately three micrometers (~3 μm) and ~5 μm, such as, for example, λ=~3 μm, λ=~3.05 μm, λ=~3.1 μm, λ=~3.15 μm, λ=~3.2 μm, λ=~3.25 μm, λ=~3.3 μm, λ=~3.35 μm, λ=~3.4 μm, λ=~3.45 μm, λ=~3.5 μm, λ=~3.55 μm, λ=~3.6 μm, λ=~3.65 μm, λ=~3.7 μm, λ=~3.75 μm, λ=~3.8 μm, λ=~3.85 μm, λ=~3.9 μm, λ=~4 μm, λ=~4.05 μm, λ=~4.1 μm, λ=~4.15 μm, λ=~4.2 μm, λ=~4.25 μm, λ=~4.3 μm, λ=~4.35 μm, λ=~4.4 μm, λ=~4.45 μm, λ=~4.5 μm, λ=~4.55 μm, λ=~4.6 μm, λ=~4.65 μm, λ=~4.7 μm, λ=~4.75 μm, λ=~4.8 μm, λ=~4.85 μm, λ=~4.9 μm, or λ=~5 μm. For other embodiments, the signaling beacon 130 comprises an antenna (e.g., wireless antenna, etc.).

Internal to the drone 100 are a controller 135 (or other processing means), a power supply 140 (such as a battery or other type of power cell), and a motor 145 (or other rotational means for rotating the first rotor 110 and the second rotor 115). In the embodiment of FIG. 1, the power supply 140 supplies power to the motor 145, which is controlled by the controller 135. By way of example, one embodiment of the controller 135 is a Raspberry Pi Zero (developed by the Raspberry Pi Foundation (headquartered in Cambridge, England) in association with Broadcom, Inc. (headquartered in San Jose, California, United States)), Cube (from CubePilot Pty. Ltd., headquartered in Geelong, Australia), or other known suite of auto-pilot hardware and software that is commercially available for both manned and unmanned drones.

In some embodiments, the controller 135 is operatively coupled (either directly or indirectly) to the first rotor 110, the second rotor 115, the perching structure 120, the detector 125, and the signaling beacon 130.

For some preferred embodiments, the controller 135 rotates the first rotor 110 at a first rotation speed to elevate the drone 100 to a perch (preferably an elevated perch that resides above ground level). The controller 135 also counter-rotates the second rotor 115 at a second rotation speed, which counterbalances the first rotation speed.

It should be appreciated that, for either drones without rotors (e.g., ornithopters, etc.) or drones 100 with rotors 110, 115 (such as that shown in FIG. 1), the controller 135 controls all aspects of autonomously piloting the drone 100 to an elevated perch, detecting whether or not the drone 100 has perched (by, for example, receiving from the detector 125 an indication that the drone 100 has perched), and detachably perching the drone 100 on the elevated perch using the perching structure 120. Insofar as systems and processes for autonomously navigating to a perch and securely perching are known to those having skill in the art, only a truncated discussion of the autonomous navigation and perching are included within this disclosure.

Continuing, the controller 135 selectively activates the signaling beacon 130. For some embodiments, the signaling beacon 130 is activated by the controller in response to the controller 135 receiving the indication that the drone 100 has perched. For other embodiments, the signaling beacon 130 is activated as the drone 100 ascends, thereby providing a detectable signal both during ascension and after perching.

By providing an elevated signaling system, such as that shown in FIG. 1, the higher elevation with fewer visual obstructions (e.g., above canopy cover) increases visibility significantly, thereby increasing the chances of a speedy rescue and, correspondingly, increasing the chances of survival.

Figure 2B:
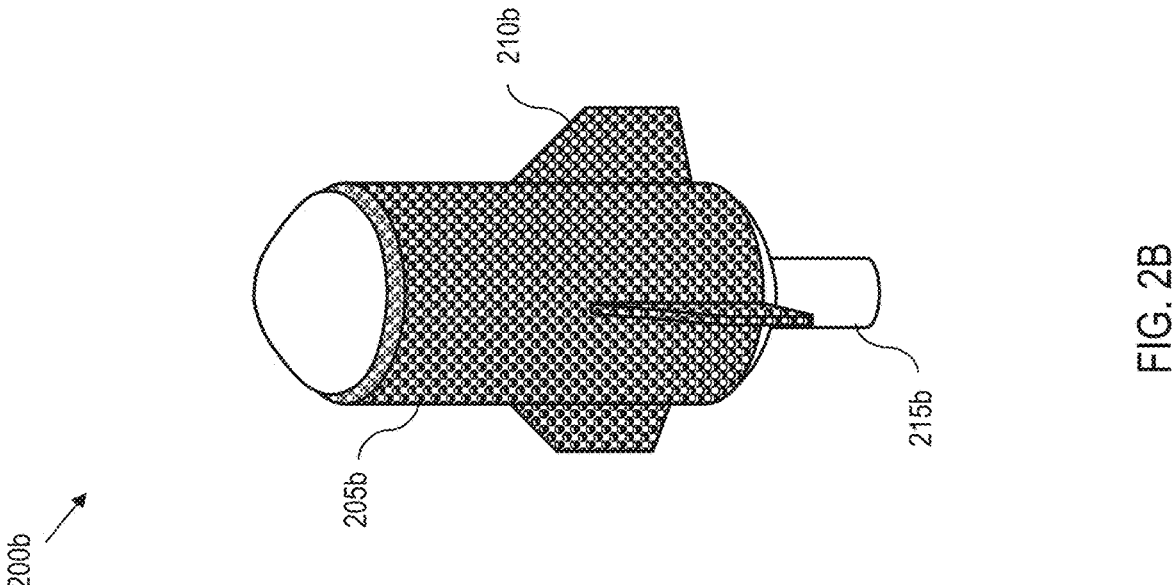
FIG. 2B is a drawing that shows a perspective view of a launch housing 200b.
Figure 2A:
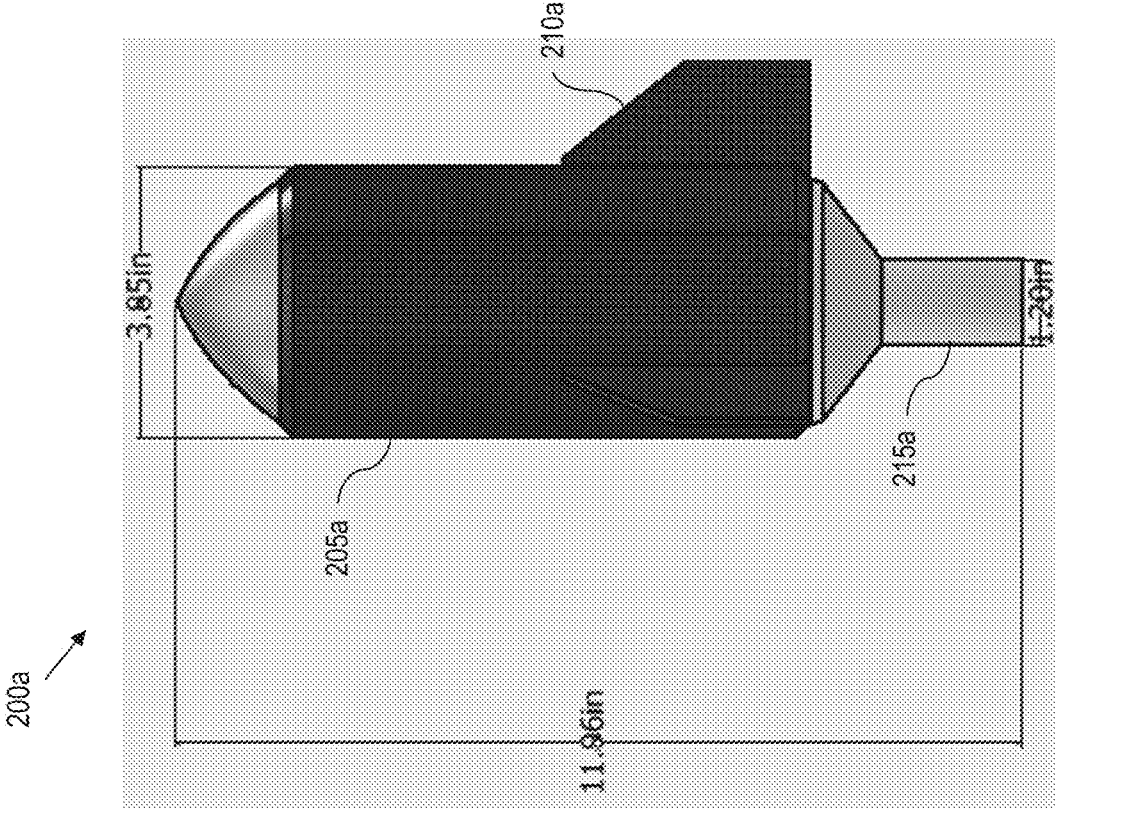

FIGS. 2A and 2B (collectively designated herein as FIG. 2) are drawings that show different views of a launch housing 200a, 200b (collectively designated herein as 200). The launch housing 200 is a vehicle by which the drone 100 can be launched using, for example, compressed air, munition, or other catapulting means. As such, in the embodiment of FIG. 2, the launch housing 200 comprises a hollow housing body 205a, 205b (collectively, 205) with optional fins 210a, 210b (collectively, 210), which allow for stable placement of the launch housing 200 on uneven surfaces. In other embodiments, the launch housing 200 comprises an anchor 215a, 215b (collectively, 215), which permits the launch housing 200 to be securely affixed into the ground.

Figure 3:
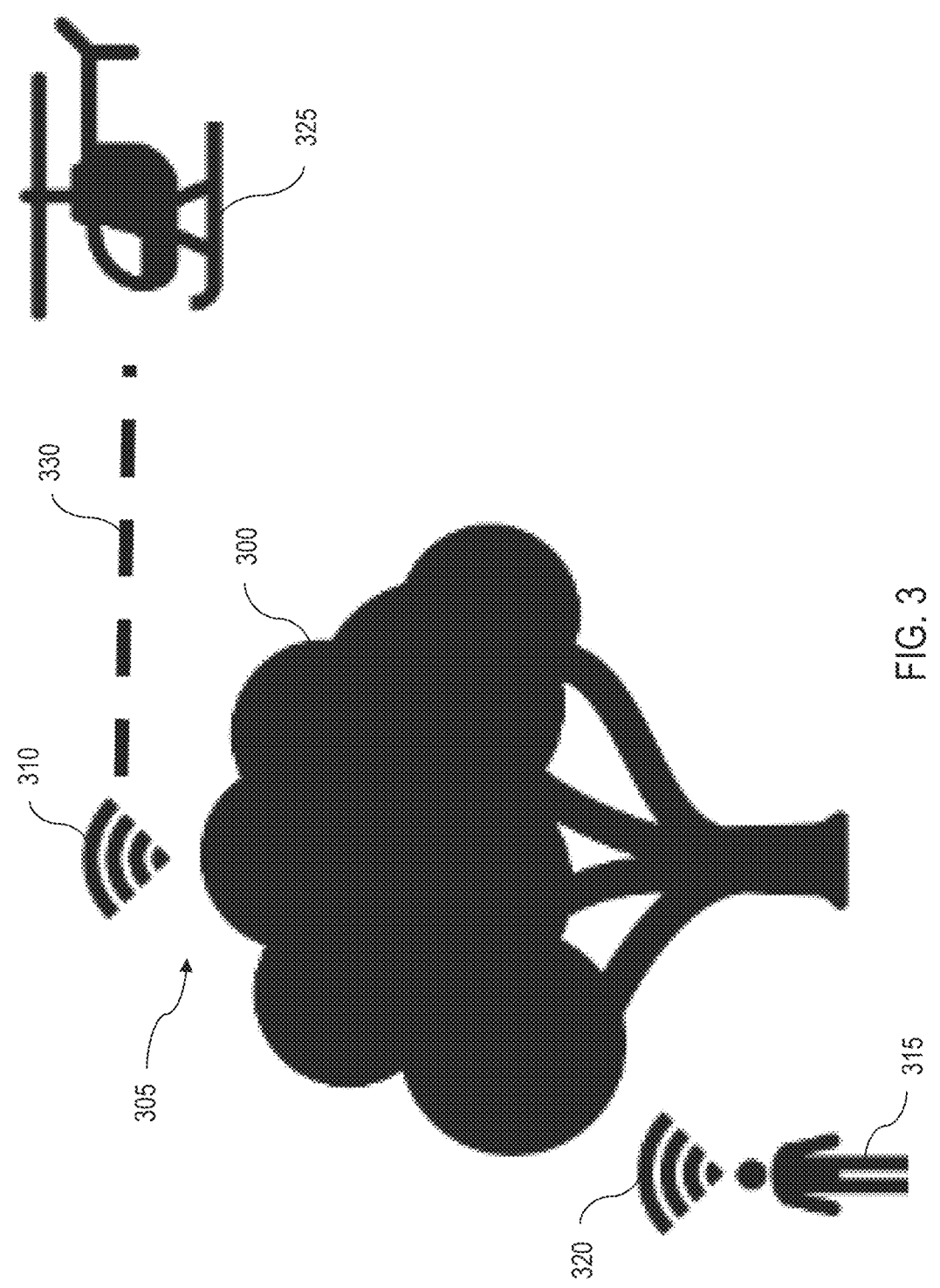
FIG. 3 is a drawing that illustrates improved visibility from an elevated perch 300.

Lastly, FIG. 3 is a drawing that illustrates improved visibility from an elevated perch 300. If a signaling drone 100 (not shown in FIG. 3) is positioned above the canopy 305 and emits a signal 310, the higher elevation provides clearer visibility to the drone 100 because there are fewer obstructions (if any) at higher and higher elevations. Should the drone 100 include a repeater or other type of signal relay, then an individual 315 on the ground with a primary transmitter can emit a ground-based signal 320, which the drone 100 receives and re-transmits through the signaling beacon 130 (not shown in FIG. 3) as the signal 310 to any potential search and rescue personnel, such as a helicopter rescuer 325. The dashed line 330 represents an unobstructed line-of-sight from the helicopter rescuer 325 to the elevated signal 310 emitted by the signaling beacon 130.

Some embodiments can be considered to be improvements to already existing autonomous drones, which are capable of autonomously finding an elevated perch (meaning, one that is above ground level) and perching securely on the elevated perch. Because autonomously perching drones are known, the improvement comprises a detector 125 that is configured to detect whether the drone 100 has perched, a signaling beacon 130 affixed to the drone 100, and a controller 135 operatively coupled to the detector 125 and the signaling beacon 130. In the improvement, the controller 135 is configured to receive an indication from the detector 125 when the drone 100 has perched. The controller 135 selectively activates the signaling beacon 130 in response to receiving the indication from the detector 125.

More broadly, some embodiments comprise signaling systems with a signaling beacon 130 (affixed to a drone 100) and a controller 135 (operatively coupled to the signaling beacon 130). The controller 135 autonomously pilots the drone 100 to an elevated perch (using known processes, such as those that exist for ornithopters or similar drones). Additionally, the controller 135 activates the signaling beacon 130.

As demonstrated from FIGS. 1 through 3, by providing an elevated signaling system that resides at a higher elevation with fewer visual obstructions (e.g., above canopy cover), visibility can be increased significantly, thereby increasing the chances of a speedy rescue and, correspondingly, increasing the chances of survival.

Any process descriptions (e.g., blocks in flow charts, etc.) should be understood as encompassing alternate implementations in which functions may be executed out of order from that shown or discussed, including substantially concurrently or in reverse order, depending on the functionality involved, as would be understood by those reasonably skilled in the art of the present disclosure.

The controller may be implemented in hardware, software, firmware, or a combination thereof. In the preferred embodiment(s), the controller is implemented in software or firmware that is stored in a memory and that is executed by a suitable instruction execution system. For such software-based implementations, the function is performed by logical structures. Thus, for purposes of any phrases that are construed as means-plus-function elements, the logical structures are the means portion of the means-plus-function element, while the functions performed by those means are the function portion of the means-plus-function element.

If the controller is implemented in hardware, as in an alternative embodiment, the controller can be implemented with any or a combination of the following technologies, which are structures that are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The controller can also be implemented by a program that resides in a computer-readable medium. For such implementations, the controller comprises an ordered listing of executable instructions for implementing logical functions, which can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A signaling system comprising:
    a drone comprising:
        a rotating first rotor; and
        a counter-rotating second rotor;
    a perching structure affixed external to the drone, the perching structure for perching the drone on an elevated perch, the elevated perch elevated above ground level;
    a detector located on the drone, the detector being configured to detect whether the drone has perched on the elevated perch;
    a signaling beacon located atop the drone;
    a controller operatively coupled to the first rotor, the controller further operatively coupled to the second rotor, the controller further operatively coupled to the detector, the controller further operatively coupled to the perching structure, the controller further operatively coupled to the signaling beacon, the controller configured to:
        rotate the first rotor at a first rotation speed to elevate the drone to the elevated perch;
        counter-rotate the second rotor at a second rotation speed to counterbalance the first rotation speed;
        autonomously pilot the drone to the elevated perch;
        detachably perch the drone on the elevated perch using the perching structure;
        receive from the detector an indication that the drone has perched; and
        selectively activate the signaling beacon in response to receiving the indication that the drone has perched; and
    a repeater operatively coupled to the controller, the repeater further operatively coupled to the signaling beacon, wherein:
        the repeater is configured to receive a signal from a primary signal source, the repeater further configured to transmit the signal to the signaling beacon;

the signaling beacon is further configured to receive the signal from the repeater; and the controller is further configured to control reception of the signal by the repeater, the controller further configured to control transmission of the signal from the repeater to the signaling beacon, the controller further configured to control reception of the signal by the signaling beacon, the controller further configured to selectively activate the signaling beacon to transmit the signal.

2. The signaling system of claim 1, wherein the perching structure comprises a structure selected from the group consisting of:

legs;

telescoping legs;

hooks; and claws.

3. The signaling system of claim 1, wherein the first rotor comprises a structure selected from the group consisting of:

a fixed-pitch propeller;

a foldable propeller;

a controllable-pitch propeller;

a feathered propeller; and an airfoil.

4. The signaling system of claim 1, wherein the second rotor comprises a structure selected from the group consisting of:

a fixed-pitch propeller;

a foldable propeller;

a controllable-pitch propeller;

a feathered propeller; and an airfoil.

5. The signaling system of claim 1, wherein the detector comprises a camera.

6. The signaling system of claim 1, wherein the detector comprises a sensor.

7. The signaling system of claim 1, wherein the signaling beacon comprises an apparatus selected from the group consisting of:

a strobe light;

an infrared (IR) strobe light;

a wireless antenna; and an IR beacon.

8. An improvement to a system comprising a drone, the drone configured to autonomously find an elevated perch, the elevated perch elevated above ground level, the drone further configured to autonomously perch on the elevated perch, the improvement comprising:

a detector configured to detect whether the drone has perched;

a signaling beacon affixed to the drone;

a controller operatively coupled to the detector, the controller further operatively coupled to the signaling beacon, the controller configured to:

receive an indication from the detector when the drone has perched; and selectively activate the signaling beacon in response to receiving the indication from the detector; and a repeater operatively coupled to the controller, the repeater further operatively coupled to the signaling beacon, wherein:

the repeater is configured to receive a signal from a primary signal source, the repeater further configured to transmit the signal to the signaling beacon;

the signaling beacon is further configured to receive the signal from the repeater; and the controller is further configured to control reception of the signal by the repeater, the controller further configured to control transmission of the signal from the repeater to the signaling beacon, the controller further configured to control reception of the signal by the signaling beacon, the controller further configured to selectively activate the signaling beacon to transmit the signal.

9. The improvement of claim 8, wherein the detector comprises a camera.

10. The improvement of claim 8, wherein the detector comprises a sensor.

11. The improvement of claim 8, wherein the signaling beacon comprises an apparatus selected from the group consisting of:

a strobe light;

an infrared (IR) strobe light;

a wireless antenna; and an IR beacon.

12. The improvement of claim 8, wherein the signaling beacon comprises a strobe beacon operating at a center wavelength of between approximately three micrometers ($\sim3$ µm) and $\sim5$ µm.

13. The improvement to the system of claim 12, wherein the center wavelength is one of: $\lambda=\sim3$ µm, $\lambda=\sim3.05$ µm, $\lambda=\sim3.1$ µm, $\lambda=\sim3.15$ µm, $\lambda=\sim3.2$ µm, $\lambda=\sim3.25$ µm, $\lambda=\sim3.3$ µm, $\lambda=\sim3.35$ µm, $\lambda=\sim3.4$ µm, $\lambda=\sim3.45$ µm, $\lambda=\sim3.5$ µm, $\lambda=\sim3.55$ µm, $\lambda=\sim3.6$ µm, $\lambda=\sim3.65$ µm, $\lambda=\sim3.7$ µm, $\lambda=\sim3.75$ µm, $\lambda=\sim3.8$ µm, $\lambda=\sim3.85$ µm, $\lambda=\sim3.9$ µm, $\lambda=\sim4$ µm, $\lambda=\sim4.05$ µm, $\lambda=\sim4.1$ µm, $\lambda=\sim4.15$ µm, $\lambda=\sim4.2$ µm, $\lambda=\sim4.25$ µm, $\lambda=\sim4.3$ µm, $\lambda=\sim4.35$ µm, $\lambda=\sim4.4$ µm, $\lambda=\sim4.45$ µm, $\lambda=\sim4.5$ µm, $\lambda=\sim4.55$ µm, $\lambda=\sim4.6$ µm, $\lambda=\sim4.65$ µm, $\lambda=\sim4.7$ µm, $\lambda=\sim4.75$ µm, $\lambda=\sim4.8$ µm, $\lambda=\sim4.85$ µm, $\lambda=\sim4.9$ µm, or $\lambda=\sim5$ µm.

14. A signaling system comprising:

a signaling beacon affixed to a drone;

a controller operatively coupled to the signaling beacon, the controller configured to:

autonomously pilot the drone to an elevated perch; and activate the signaling beacon; and a repeater operatively coupled to the controller, the repeater further operatively coupled to the signaling beacon, wherein:

the repeater is configured to receive a signal from a primary signal source, the repeater further configured to transmit the signal to the signaling beacon;

the signaling beacon is further configured to receive the signal from the repeater; and the controller is further configured to control reception of the signal by the repeater, the controller further configured to control transmission of the signal from the repeater to the signaling beacon, the controller further configured to control reception of the signal by the signaling beacon, the controller further configured to selectively activate the signaling beacon to transmit the signal.

15. The signaling system of claim 14, wherein the signaling beacon comprises an apparatus selected from the group consisting of:

a strobe light;

an infrared (IR) strobe light;

a wireless antenna; and an IR beacon.

16. The signaling system of claim 14, wherein the signaling beacon comprises a strobe beacon operating at a center wavelength of between approximately three micrometers ($\sim3$ µm) and $\sim5$ µm.

17. The signaling system of claim 16, wherein the center wavelength is one of: $\lambda = \sim 3$ µm, $\lambda = \sim 3.05$ µm, $\lambda = \sim 3.1$ µm, $\lambda = \sim 3.16$ µm, $\lambda = \sim 3.2$ µm, $\lambda = \sim 3.25$ µm, $\lambda = \sim 3.3$ µm, $\lambda = \sim 3.35$ µm, $\lambda = \sim 3.4$ µm, $\lambda = \sim 3.45$ µm, $\lambda = \sim 3.5$ µm, $\lambda = \sim 3.55$ µm, $\lambda = \sim 3.6$ µm, $\lambda = \sim 3.65$ µm, $\lambda = \sim 3.7$ µm, $\lambda = \sim 3.75$ µm, $\lambda = \sim 3.8$ µm, $\lambda = \sim 3.85$ µm, $\lambda = \sim 3.9$ µm, $\lambda = \sim 4$ µm, $\lambda = \sim 4.05$ µm, $\lambda = \sim 4.1$ µm, $\lambda = \sim 4.16$ µm, $\lambda = \sim 4.2$ µm, $\lambda = \sim 4.25$ µm, $\lambda = \sim 4.3$ µm, $\lambda = \sim 4.35$ µm, $\lambda = \sim 4.4$ µm, $\lambda = \sim 4.45$ µm, $\lambda = \sim 4.5$ µm, $\lambda = \sim 4.55$ µm, $\lambda = \sim 4.6$ µm, $\lambda = \sim 4.65$ µm, $\lambda = \sim 4.7$ µm, $\lambda = \sim 4.75$ µm, $\lambda = \sim 4.8$ µm, $\lambda = \sim 4.85$ µm, $\lambda = \sim 4.9$ µm, or $\lambda = \sim 5$ µm.

* * * * *